(No Model.)  3 Sheets—Sheet 2.
M. W. SPENCER.
TYPE WRITING MACHINE.
No. 579,778.  Patented Mar. 30, 1897.
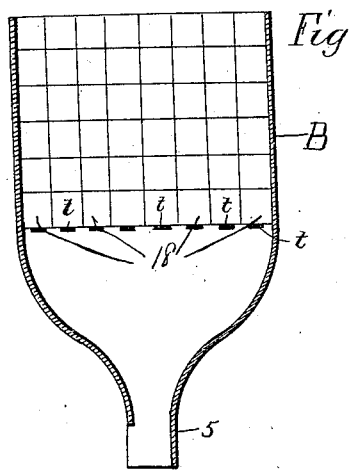
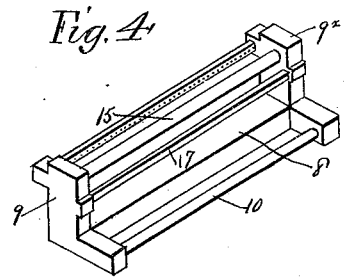
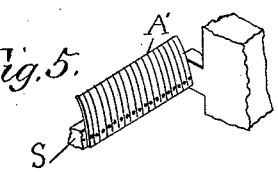
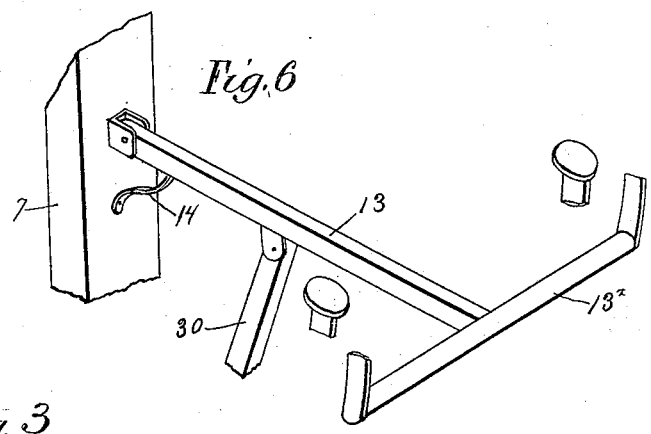
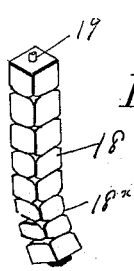
Witnesses:
F. L. Ourand
A. P. Smith
Inventor
Mark W. Spencer.
By H. B. Willson
Attorney (No Model.)  3 Sheets—Sheet 3.
M. W. SPENCER.
TYPE WRITING MACHINE.
No. 579,778.  Patented Mar. 30, 1897.
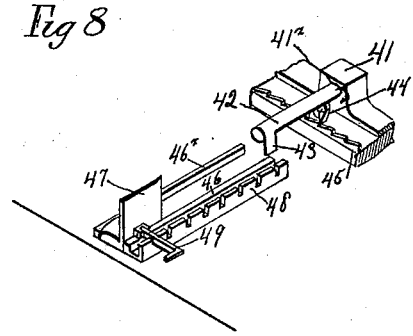
Fig. 8
Fig. 9
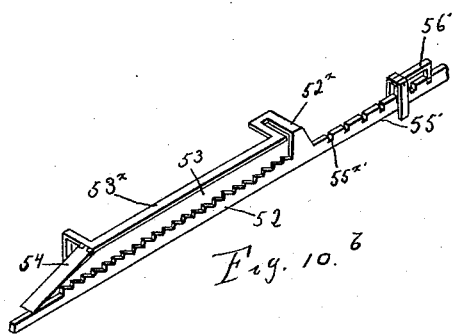
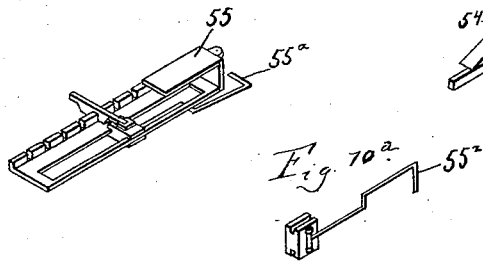
Fig. 10
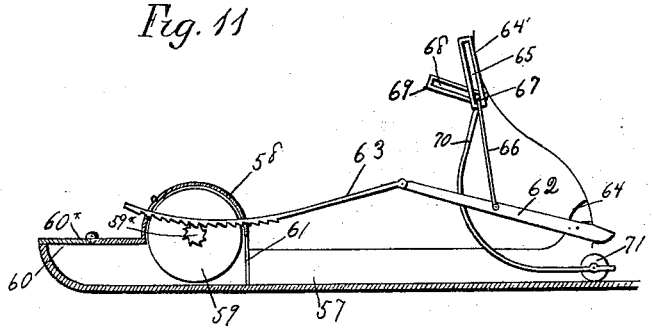
Fig. 11
Witnesses:
F. L. Ourand
A. P. Smith
Inventor:
Mark W. Spencer
By _____
Attorney.

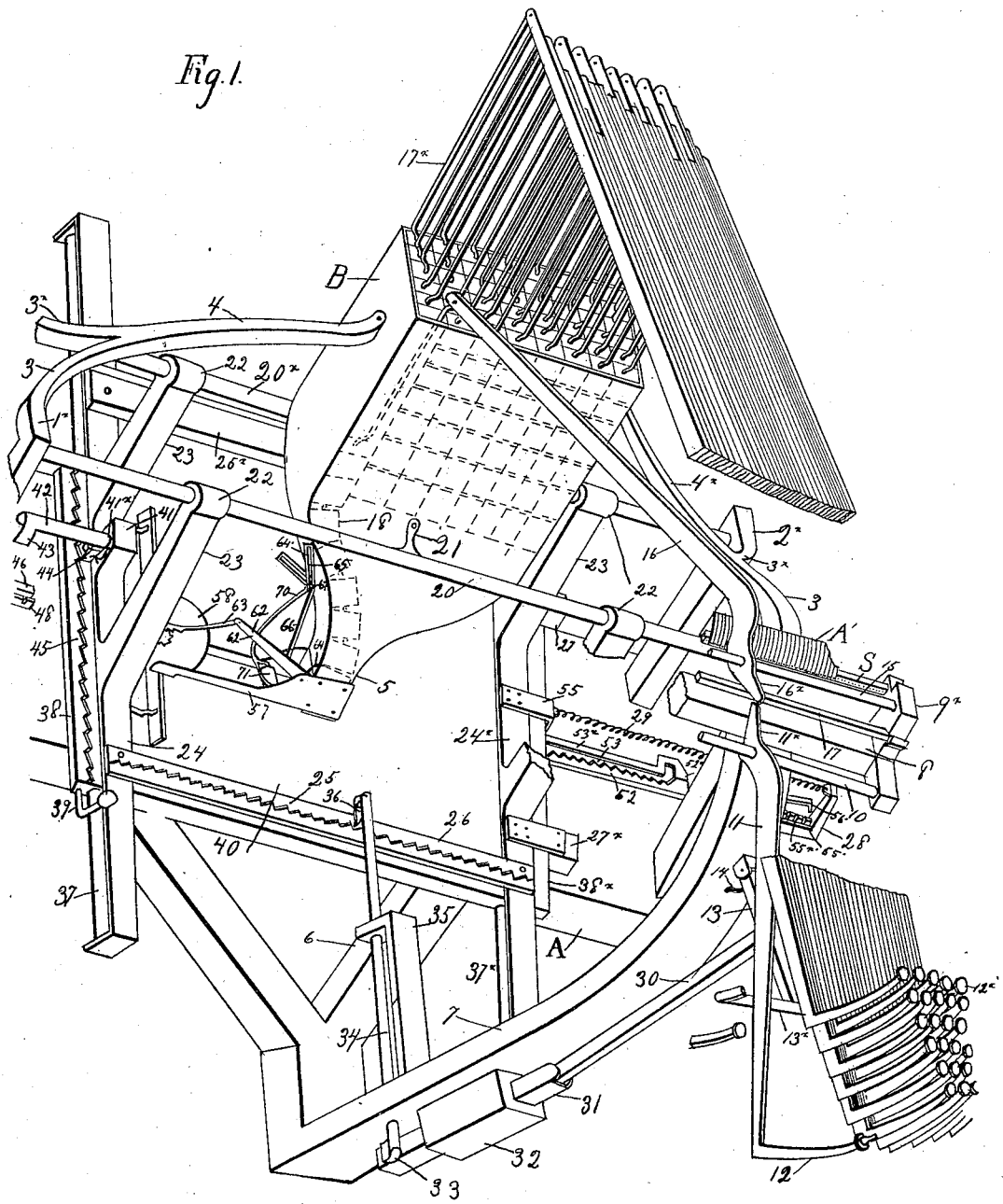

UNITED STATES PATENT OFFICE.

MARK W. SPENCER, OF GRAVES, MISSISSIPPI.

TYPE-WRITING MACHINE.

SPECIFICATION forming part of Letters Patent No. 579,778, dated March 30, 1897.

Application filed April 21, 1896. Serial No. 588,483. (No model.)

*To all whom it may concern:*

Be it known that I, MARK W. SPENCER, a citizen of the United States, residing at Graves, in the county of Benton and State of Mississippi, have invented certain new and useful Improvements in Type-Writing Machines; and I do declare the following to be a full, clear, and exact description of the invention, such as will enable others skilled in the art to which it appertains to make and use the same.

My invention has relation to type-writing machines.

In the following specification the machine is fully described and the manner of making and constructing it stated. I have also explained the principle thereof and have particularly pointed out and distinctly claimed the parts, improvements, and combinations embodying the novelty of the invention.

In the accompanying drawings, forming a part of this specification, Figure 1 is a perspective of the machine. Fig. 2 is a central vertical section of the funnel-shaped type-box. Fig. 3 shows details of the section type bars or stems, showing the forms of the sections of the type stems or bodies and the means for connecting the sections yieldingly together. Fig. 4 is a detail perspective of the bracket in which the key-levers and type-levers are fulcrumed. Fig. 5 is a detail of the lifting-springs of the type-levers. Fig. 6 is a detail of the yoke-frame for returning the key-levers to normal position after having been depressed. Fig. 7 is a view of the hand-piece for striking down the keys. Fig. 8 is a detail of the line-shifting mechanism. Fig. 9 is a reverse view of the shifter-block of the line-shifting mechanism. Figs. 10, 10$^a$, and 10$^b$ are details of the holdback-rack of the carriage. Fig. 11 is a detail of the inking mechanism.

Referring to the drawings, A designates the base-plate of the machine, preferably rectangular in shape and of such superficial area as may be requisite to support the machine-frames and the operative mechanism. Adjacent to each end of the base-piece and near the corners are secured standards 1 1$^\times$ and 2 2$^\times$, having arms 3 3$^\times$ formed on their upper ends, which are curved inward and directed upward and united at their ends, from which are projected the single arms 4 4$^\times$, having the type-box B secured between the ends, substantially as shown in the drawings.

B designates the type-box, consisting of a rectangular box having the lower portion made with tapering curved sides terminating in a rectangular tube 5 of a size sufficient to take in the lower portion of any one of the types. From the side of the bed-plate extends a support 6, from the outer end of which rises a standard 7, having its upper portion directed inward and overhanging, as shown, and carrying on its upper end a substantial bracket 8, consisting of a suitable frame having end pieces 9 9$^\times$, in which are mounted the respective fulcrums for the type-bars, keys, and return-springs, as hereinafter specified. In the bracket 8 is secured a fulcrum-bar 10, on which are fulcrumed the key-levers 11, consisting of suitable metal bars having their short arms 11$^\times$ curved at the points to make the proper engagement and contact with the short ends or arms of the type-levers. The outer ends of the key-levers are turned up, as at 12, and have secured on the ends a button 12$^\times$, on which is formed a letter or character corresponding with the type the lever is intended to operate. To the standard 7 is pivotally secured the end of a lever 13, carrying on its outer end a cross-bar 13$^\times$, arranged to rest normally with its upper edge or face under and against the bunch or nest of key-levers, and is held in such position by means of a spring 14, secured to the standard 7 with its free end bearing upward on the lever 13, the spring also exerting its force to return a key to normal position when depressed. The ends of the cross-bar 13$^\times$ are turned up at right angles to the bar and set against the sides of the bunch of key-levers, as shown, and the lever with its cross-bar and connections constituting the spacing-lever to shift the carriage. In the bracket 8 is also secured a second fulcrum-bar 15, on which are fulcrumed the type-levers 16, substantially of the shape and construction shown in the drawings. The short arms 16$^\times$ of the type-levers rest on the short arms of the key-levers and are additionally supported by means of a stop-bar 17, and the long arms are extended so that their ends will stand vertically and centrally over the type-stems to which they are to be respectively connected. The type-levers are connected to the upper ends of the type-stems by means of a metal rod $17^\times$, the upper end thereof being pivotally hung in the end of the type-lever and the lower end preferably struck at an angle, as shown, and the end suitably secured in the end of the sectional type-stems. The type-stems 18 are made of any suitable type material, and are composed of sections $18^\times$, rectangular in cross-section and having their ends somewhat rounded to permit them to automatically assume the curvature or direction to carry them into the opening at the end of the type-box, as indicated in dotted lines in Fig. 1 of the drawings. The sections of the type-stems are flexibly and yieldingly secured together by means of a cord or wire 19, run centrally through them and secured by any proper means. The lower section of the type-stems has formed on it, as heretofore stated, a letter or other character $t$. The flexible type-stems when arranged in the type-box snugly fill the upper and enlarged portion of the type-box and are adapted to be pushed down, one at a time, by the connected levers.

A designates the return or lifting springs for the type-levers, arranged on a bar $s$ in the bracket 8 and bearing upward on the respective type-lever with their free ends.

It will be perceived from the foregoing description that when a key-lever is depressed the type-lever engaged thereby will push the type down into and projecting from the opening into the type-box onto the sheet arranged on the platen and the impression made. After the impression has been made the spring-actuated cross-bar under the key-levers will exert its force and return the depressed key-lever to normal position, and the spring which bears on the depressed type-lever will lift up the outer end of the lever and draw the type-stem up to its normal position in the type-box.

20 $20^\times$ designate two parallel carriage-bars, having their ends properly fastened in the corner posts or standards of the bed-plate, and at their middle are formed or provided with tongues 21, the upper ends of which are fastened to sides of the type-box, as shown, to hold the carriage-bars in alinement and against springing and to hold the type-box from lateral displacement. On the carriage-bars 20 $20^\times$ are slidingly fitted the sleeves 22 of the carriage-hangers 23, carrying on their lower ends the side bars 24 $24^\times$ of the carriage. These side bars of the carriage are L-shaped in cross-section, as shown, and are connected together and strengthened by cross-pieces 25 $25^\times$, and on the cross-piece 25 is fixed a rack-bar 26, by means of which the carriage is moved across the bed-plate of the machine. On the side bar $24^\times$ of the carriage are secured two elastic buffers 27 $27^\times$, which abut against the posts of the frame when the carriage is drawn or moved back to the starting-point.

On the bed of the machine is fixed a standard 28, to the upper end of which is fastened one end of the spring 29, the other end of the spring being suitably fastened to the carriage, the spring serving and operating to return the carriage to normal or initial position. To the spacing-lever 13 is pivotally hung a bar 30, having its lower end pivotally jointed to a plunger 31, sliding in a sleeve 32 on the standard 7, the end of the plunger engaging with a cam-lug 33 on a spacing-rod 34, journaled through the standard 7 and in a bracket 35 and carrying on its inner end a pawl 36, which engages with the rack-bar 26, as shown.

In the recesses of the angular side pieces of the carriage are mounted two round bars 37 $37^\times$, constituting the bearings or carriers of the platen and its frame. The platen-frame is rectangular in shape, and composed of side bars 38 $38^\times$, mounted to slide on the round bars 37 $37^\times$, and the end bars 39 $39^\times$, the platen 40, consisting of a flat plate of suitable material, being secured in the frame to move therewith. The platen-frame is moved in the direction of the line by the carriage and transversely thereto by means of a pawl and rack as follows: On the side bar of the carriage is mounted and secured a post 41, formed with a bearing $41^\times$ in its upper end, in which is journaled a bar 42, formed on its free end with a cam-lug 43, and carrying adjacent to its bearing a pawl 44, which engages in a rack-bar 45 on the side bar of the platen-frame. On the bed of the machine are secured or formed two guide-flanges 46 $46^\times$, between which the shifter-block 47 is fitted to slide therein, and to hold the block 47 in any set position a rack-bar 48 is fixed on one of the guide-flanges, and a bar 49 has one end jointed to the shifter-block, the bar being adapted to engage the notches of the rack, and so hold it in any position to which it may be set. The block 47 constitutes the means for spacing the lines, and is formed with a plain front face, against which the cam-lug on the shifting rod or bar 42 bears, and on the end carries a curved spring 50, and on the rear is formed with a cam or inclined surface, so that the cam-lug is carried past the end of the spring and engages the inclined surface of the block, which will move the pawl to push the platen-frame the required space. This block 47 also serves to determine the length of the line to be written, since by setting it at any point in the slides it will terminate the line when the cam-lug shifts the platen to make the line-space. On the platen is a suitable clamping bar or plate 51, which holds the sheet down on the platen.

On the bed-plate is secured the holdback-rack for the carriage, (shown in detail in Fig. 10 of the drawings,) and reference being thereto had 52 designates the rack-bar, formed at its outer end with a head-piece $52^\times$, made higher than the rack-bar and extended laterally, and from the inner end of the head-piece is carried a bar bent or shaped at an angle to the inner face of the head-piece to form a slot or opening 53, from whence the bar 53× is carried parallel with the rack-bar, but arranged on a higher plane, and at the end of the bar 53× is hinged a bridge-piece or switch 54, adapted to drop down and rest on the rack, as shown. On the carriage is secured a bracket 55, to which is pivotally connected a pawl 55×, the end being bent at right angles to the arm of the pawl, and a spring 56 is provided to bear down on the pawl and keep it in engagement with the rack. It will be perceived from the foregoing description that when the carriage is shifted intermittently this pawl will engage the rack-bar and pass under the bar 53× until the pawl reaches the end of the rack-bar, when it will lift the bridge-piece 54 and pass beyond it, when the bridge-piece will drop down, and there being no rack-teeth at this point to engage the return-spring exerts its force to draw the carriage back, and in this movement the pawl rides up the bridge-piece onto the bar 53×, free from the rack-bar, and until it reaches the end of the bar at the recess or slot, when the pawl again drops down through the slot into engagement with the rack-bar. To the head-piece of the rack-bar is connected a gage-bar 55, formed with notches 55×, arranged apart at the same distances as the notches in the shifting-block rack at the other side of the machine. The end of this gage-bar is let through the post to which the end of the return-spring is connected and is held in any adjusted position to start the line by means of a pawl 56, so that by adjusting the gage-bar the rack-bar head-piece with the connections will be correspondingly adjusted and moved and the initial point of the line thus fixed.

To the lower end of the type-box is secured an ink-trough 57, carrying on its outer end circular casing 58, in which is journaled a rotary inking-pad 59, carrying on its journal a small gear-wheel 59×. The ink is supplied to the rotary inking-pad through an opening 60 in the trough, a closure 60× being hinged to the trough to close the opening. The casing of this inking-pad is made in two parts, the upper part being so that it can be taken off or turned back on hinges to get access to the pad for any desired purpose. In the front of the casing is an opening 61, through which is exposed a part of the face of the pad against which the type-inking roller impacts to receive its supply of ink. To the side of the trough is fulcrumed a lever 62, disposed with its lower end in the path of the descending type, and to be tilted thereby, and having jointed to its outer end a curved rack-bar 63, which engages with the small gear-wheel 59×, so that when the lever is rocked the rock-bar will be drawn across the gear and rotate the ink-supply roller. A suitably-arranged spring 64 restores the lever 62 to its lower position after having been raised.

On the type-box is secured a vertically-arranged plate 64, having a slot 65 longitudinally disposed therein. To the lever 62 is connected the lower end of a rod 66, the upper end of which is provided with a pin 67, which has its bearing in the slot 64 and also engages in the slot 68 of an arm 69, and to the lower end of the arm 69 is rigidly secured the hanger 70, carrying in its bifurcated arms the inking-roller 71, the hanger being so shaped that when in normal position the inking-roller will stand in the type-passage, as shown in dotted lines. The ink-roller has radial arms projected from its bearings to prevent the face of the roller contacting with the type-passage. It will now be observed that when the descending type contacts with the inking-roller that element will be carried down and pass across the type and supply it with the requisite ink. Then, as the type descends farther it contacts with the end of the lever 62, which is thus tilted, and this movement carries or swings the inking-roller outward and against the ink-supply roller. When the type descends and the type-passage is free, the lever 62 drops down, and the inking-roller is thrown to its normal position in the type-passage.

The operation of the machine may be rehearsed as follows: The paper is placed on the platen and secured by the clamp. A key-lever is then depressed, which depresses the proper type-lever and carrying down the type, which is inked on its passage through the type-passage, as heretofore specified. When the impression is being made, the plunger operated by the spacing-lever has been carried down and the carriage-shifting bar turned to bring its pawl in engagement with the rack, so that the carriage is shifted one space. This operation is repeated, using the spacing-lever to make the spaces and the key-levers to effect the impressions until the line is completed, or about completed, when the line-spacer will pass the shifting block and be carried back of it on the opposite side. Simultaneous to this action the pawl on the carriage-rack will escape from the bridge-piece on the rack and the return-spring of the carriage will draw the carriage and platen back to the initial or starting point.

Having thus described my invention, what I claim, and desire to secure by Letters Patent, is—

1. A type-bar for a type-writing machine, comprising a plurality of sections rectangular in cross-section, and having rounded end faces, said sections being yieldingly secured together, substantially as specified.

2. In a type-writing machine, the combination of the key-levers, the spacing-lever operated by the key-levers, a vertically-arranged plunger operated by the spacing-lever, a carriage-operating bar formed with a cam-lug in the path of the plunger and a pawl on the inner end, a movable carriage, and a rack-bar on the carriage, engaged by the said pawl.

3. In a type-writing machine, the combination of the movable carriage, means to move the carriage intermittently, a rack-bar formed with a flange-bar higher than the rack-bar, a pawl to engage the rack-bar, and a bridge-piece at the inner end of the rack-bar to carry the pawl up on the flange-bar, and a spring to pull the carriage back.

In testimony whereof I hereunto affix my signature in presence of two witnesses.

MARK W. SPENCER.

Witnesses:
S. O. LOVE,
J. C. FANT.